United States Patent
Shitara et al.

[11] 4,041,350
[45] Aug. 9, 1977

[54] MAGNETRON ANODE AND A METHOD FOR MANUFACTURING THE SAME

[75] Inventors: Hisao Shitara, Hiratsuka; Takada Koosuke, Yokohama, both of Japan

[73] Assignee: Tokyo Shibaura Electric Co., Ltd., Kawasaki, Japan

[21] Appl. No.: 631,913

[22] Filed: Nov. 14, 1975

[30] Foreign Application Priority Data

Nov. 14, 1974  Japan .................. 49-131273
Oct. 7, 1975  Japan .................. 50-120282

[51] Int. Cl.² .......................................... H01J 25/587
[52] U.S. Cl. ............................. 315/39.75; 315/39.51; 29/25.14; 29/25.15
[58] Field of Search ........... 315/39.51, 39.53, 39.69, 315/39.75, 39.77, 39.63; 29/25.14, 25.15

[56] References Cited

U.S. PATENT DOCUMENTS

| | | | |
|---|---|---|---|
| 2,624,862 | 1/1953 | Everhart et al. | 315/39.75 X |
| 2,761,091 | 8/1956 | Gutton et al. | 315/39.75 |
| 2,922,075 | 1/1960 | LaRue | 315/39.63 |
| 3,058,029 | 10/1962 | Clampitt et al. | 315/39.69 |
| 3,305,693 | 2/1967 | Hull | 315/39.69 |
| 3,423,632 | 1/1969 | Uchimaru et al. | 315/39.75 X |
| 3,678,575 | 7/1972 | Akeyama et al. | 315/39.51 |

*Primary Examiner*—Saxfield Chatmon, Jr.
*Attorney, Agent, or Firm*—Oblon, Fisher, Spivak, McClelland & Maier

[57] ABSTRACT

Provided is a magnetron anode comprising first and second divided anode cylinders prepared by dividing an anode cylinder into two parts in a direction intersecting the cylinder axis at right angles thereto, and a plurality of vanes radially integrally formed inside each of said divided anode cylinders at intervals each equal to twice the vane interval of a finished anode cylinder, wherein said first and second divided anode cylinders and said vanes are integrally molded by brazing in a state wherein each vane integrally molded in said first divided anode cylinder and each vane integrally molded in said second divided anode cylinder are alternately equidistantly arranged.

5 Claims, 40 Drawing Figures

MAGNETRON ANODE AND A METHOD FOR MANUFACTURING THE SAME

BACKGROUND OF THE INVENTION

This invention relates to a magnetron anode, and more particularly to a magnetron anode of the type having a plurality of vanes radially provided inside the anode cylinder, and a method for manufacturing the magnetron anode.

Figure 1:
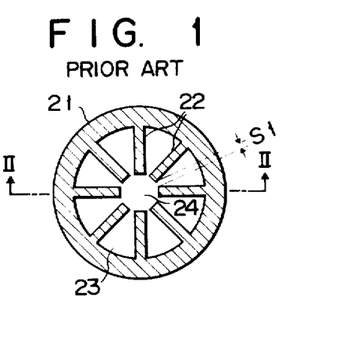
FIG. 1 is a cross sectional view showing an example of a conventional magnetron anode.

Conventionally, a magnetron anode of the type wherein a plurality of vanes are radially integrally provided inside the anode cylinder is manufactured by being subject to only one extrusion-molding process. This manufacturing method, though seemingly thought to be a most effective method, has the following actual inconveniences. Since the interval S1 between the free ends of two adjacent vanes is extremely narrow as shown in FIG. 1, the thickness of a corresponding portion of the punch for forming said interval S1 is extremely small and accordingly the punch is very low in terms of mechanical strength and therefore irresistible to mass-production. In the case of an ordinary magnetron used in a domestic microwave oven and having, for example, an output having a power of several hundred watts and an oscillating frequency of 2450 MHz, the number of vanes is 12 and said interval S1 is as small as only 1.2 mm. Accordingly, the thickness of a corresponding portion of the punch is only 1.2 mm. Thus, a punch having an extremely low mechanical strength can not but be employed. Further, when the vanemolding sections of the punch are slightly deformed during the manufacturing process, the thicknesses of the vanes become ununiform or the configurations of the free end portions of the vanes become uneven and a magnetron using an anode member with such uneven configurations of vanes becomes unstable in respect of its oscillating characteristics. Also with respect to the anode cylinder, its axial length is as relatively large as about 32 mm in the case of the abovementioned customarily used magnetron, and therefore it is considerably difficult due to a small vane-to-vane's interval to mold such large length of anode cylinder by one pressing process as disclosed, for example, in U.S. Pat. No. 3,719,068.

SUMMARY OF THE INVENTION

Accordingly, the object of the invention is to provide a magnetron anode having a construction capable of permitting the mass-production with high precision of an anode cylinder member and a method for manufacturing the magnetron anode.

This invention provides a magnetron anode prepared by dividing an anode cylinder into two parts in a direction intersecting the cylinder axis, and integrally molding inside each of the divided anode cylinders at prescribed intervals vanes of the number equal to half the number of vanes required for a finished anode cylinder, and joining together said divided anode cylinders in a state wherein each of the vanes integrally molded in one divided anode cylinder is disposed between adjacent two of the vanes integrally molded in the other divided anode cylinder, and a method for manufacturing the magnetron anode.

BRIEF DESCRIPTION OF THE DRAWING

FIGS. 27 to 35 show still another embodiment of the invention.

DETAILED DESCRIPTION OF THE PREFERRED EMBODIMENTS

Figure 2:
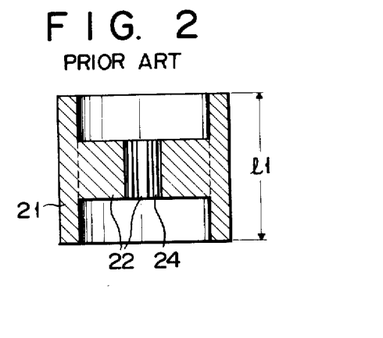
FIG. 2 is a longitudinal sectional view taken along the line II—II of FIG. 1 and seen in an arrow-indicated direction.

The following description is made by taking as an example an anode member for a magnetron having an output having a power of several hundred watts and an oscillating frequency of 2450 MHz, used in a domestic microwave oven. Usually, twelve or sixteen vanes are used for the anode member, but here in this part of the specification, for avoiding complication of the drawings the process of manufacturing an anode member having eight vanes as shown in FIGS. 1 and 2 is explained.

Figure 3:
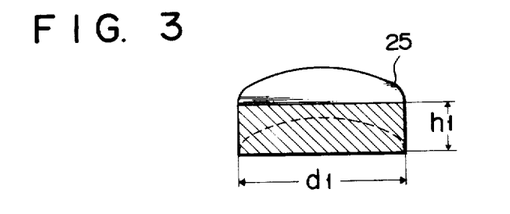
FIG. 3 is a sectional perspective view showing a mold material used at the time of carrying out the anode manufacturing method of the invention.
Figure 4:
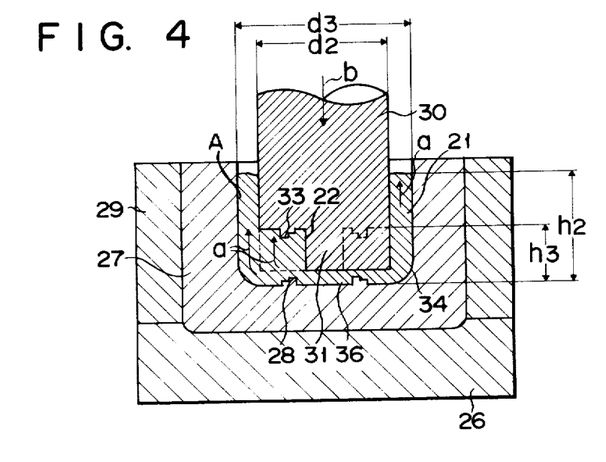
FIG. 4 is a longitudinal sectional view of a metal mold for press-molding, showing one step of the anode manufacturing process of the invention.
Figure 5:
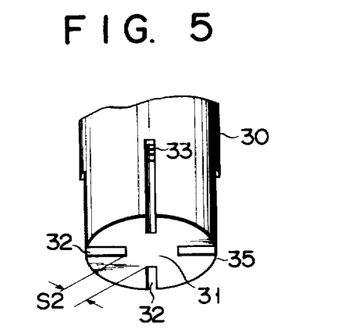
FIG. 5 is a perspective view of the punch shown in FIG. 4.
Figure 6:
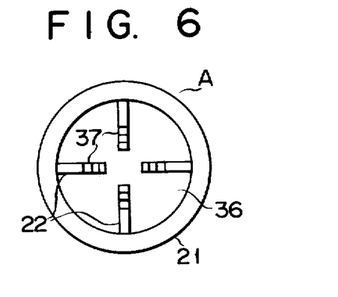
FIG. 6 is a top view of a semi-finished product obtained by using the mold and manufacturing step shown in FIG. 4.
Figure 7:
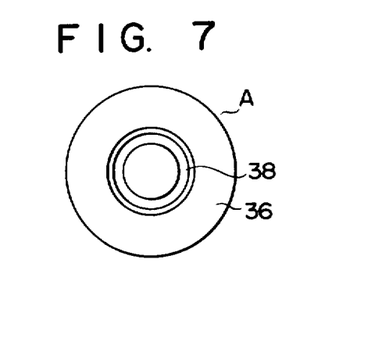
FIG. 7 is a bottom view of said semi-finished product of FIG. 6.
Figure 8:
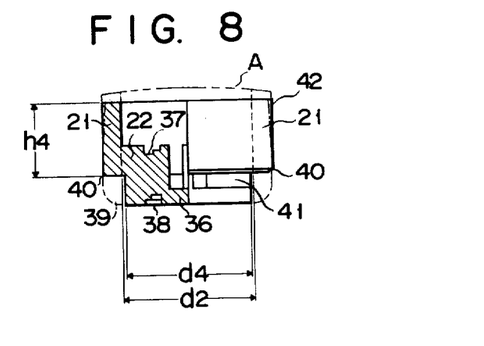
FIG. 8 is a side view, partly cut away, of a semi-finished product obtained after subject to a cutting step.

First, such a columnar mold material 25 consisting of oxygen free copper as shown in FIG. 3 is put into a hydrogen oven in order to have a better plastic flow and is annealed for about 30 minutes at high temperature, for example, at a temperature of about 450° C. The material 25 to be molded has a diameter d1 of 44 mm and a height h1 of 12 mm. Next, the mold material 25 is subject to hot extrusion-molding as shown in FIG. 4. In FIG. 4, a reference numeral 26 denotes a plate of a press-mold, and 27 designates a die, which has at the central part of its bottom section a ring-like projection 28 for forming grooves for attachment of a strap-ring. Numeral 29 indicates a reinforcing ring and 30 a punch. The punch 30, as shown also in FIG. 5, has a central columnar portion 31 corresponding to an electron-acting space 24 of FIGS. 1 and 2, slit portions 32 corresponding in position to the vanes and provided in number equal to half the number of vanes required for a finished magnetron anode and disposed correspondingly to every alternate vanes, and projection portions for forming strap-ring attaching grooves, provided at the bottom sections of said slit portions. The punch 30 has a diameter d2 of 38.5 mm and the hole of the die 27 has a diameter d3 of 44.5 mm, and a corner 34 of the bottom section of the die 27 is formed curvilinear so as to cause a smooth plastic flow of the mold material and not to cause any damage to the mechanical strength of the die. Now, the mold material 25 is put into the hole of the die 27, and the material 25 and the press-mold such as the die and punch are heated at a temperature of 200° C to 300° C, and, for example, molybdenum disulfide is applied as a lubicant to the mold material and both of the die 27 and punch 30 (particularly, the punch 30), and pressing is performed as indicated by an arrow b using a 250-ton press. Thus, the mold material 25 is subject to plastic flow as indicated by arrows a of FIG. 4 and is so molded that its anode cylinder portion 21 has a height h2 of about 24 mm. When, in this way, the moving direction of the punch 30 is opposite to the direction of the plastic flow of the mold material 25, this is called "a rearward extrusion". In this case, the mold material has a residual wall portion 36 left at its bottom section. The height h3 of the vane portion 22 is set at about 10 mm. Thus, a primary molding A as a semi-finished product is obtained. On the upper side of the vane 22 stepped grooves 37 having the same configuration and used for attachment of a strap-ring are formed as shown also in FIG. 6. Further, on the underside of the residual wall portion 36 an anuular and stepped groove 38 is formed as shown also in FIG. 7. This groove 38 has a cross section whose configuration is reverse to that of the stepped grooves 37 on the upper side of the vane 22.

Where it is desired to obtain the above-mentioned primary molding A, the molding method is not limited to the method of starting the molding process from such a mold material as shown in FIG. 3. That is, a molding having almost the same configuration as that of this primary molding may be first prepared, for example, by casting and then be molded into exactly the same dimension as that of said primary molding by extrusion-molding. Thus, the ease and dimensional precision with which the press-molding is performed can be increased. The molding A thus extrusion-molded is passed through a washing step for removing the lubricant. Next, as shown in FIG. 8, a primary molding portion indicated by a dotted line is cut off by a lathe. That is, the peripheral edge of the residual wall portion 36 and the portion 39 of the anode cylinder are so cut that the diameter d4 may become about 38.46 mm, and said primary molding portion is so cut that the height h4 of a divided anode cylinder 24 may become 16 mm.

One end of said divided anode cylinder may be situated at an intermediate position of the entire length of the vane portion (This invention is not limited to this intermediate position. That is, said one end may be situated at any given position falling within the range of the vertical full length of the vane.) And a notch 40 for holding a brazing material may be formed at the peripheral edge of said one end of the divided anode cylinder 21. Accordingly, the inner diameter d2 of the anode cylinder portion is made slightly larger than the outer diameter d4 of a remaining portion obtained by cutting the portion 39 to be cut off, and that portion of the cut-off portion or space portion 39 which is defined between another anode cylinder to be fitted and the vane portion 22 becomes a clearance 41. Further, the outer periphery of the divided anode cylinder 21 is taperingly cut as required as shown by one-dot chain line 42 so that after completion of magnetron assembling a cooling cylinder with fins (not shown) may be easily forcibly inserted over the outer periphery of the anode cylinder. In this way, the vanes 22 are integrally formed inside the divided anode cylinder 21 in such a manner that part of the vane portion 22 is allowed to project outwardly from one end of the anode cylinder.

Figure 9:
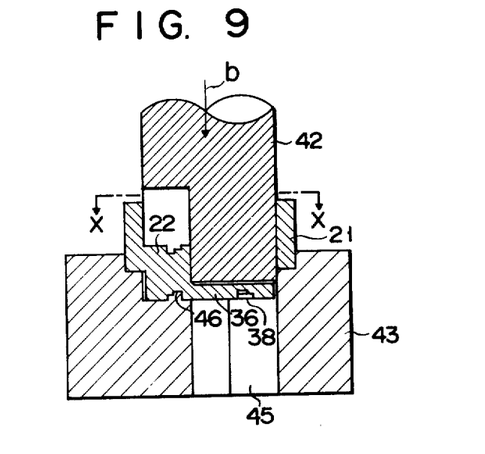
FIG. 9 is a longitudinal sectional view showing the removal of the residual wall portion.
Figure 10:
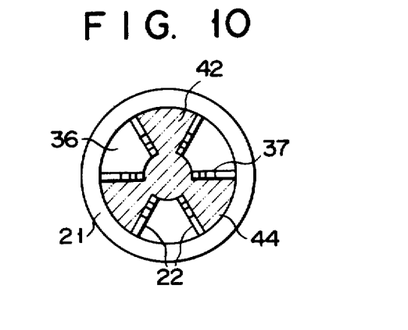
FIG. 10 is a cross sectional view taken along the line X—X of FIG. 9 and seen in an arrow-idicated direction.
Figure 11:
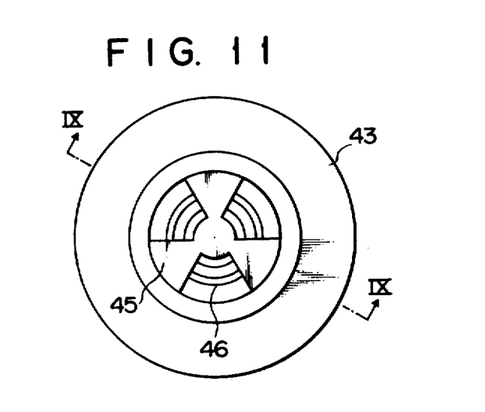
FIG. 11 is a top view of the die.

Next, the residual wall portion 36 is removed by the cold extrusion-molding (shear-molding) as shown in FIG. 9. With respect to the punch 42 and die 43, those of exactly the same dimension as that shown in FIGS. 9 and 10 are used. In FIGS. 9 and 10, for a better understanding, the case where the number of vanes 22 of the primary molding A is 6 is shown. In this case, since, it is confirmed, on account of the cold extrusion-molding, that difficulties are encountered in permitting the punch and die to have a mechanical strength sufficient to resist the mass-production, it is difficult to remove the whole of the residual wall portion through one pressing operation. Accordingly, the residual wall portion is preferably removed half by half through two pressing operations. Accordingly, as shown also in FIG. 10, with respect to the punch 42, punch portions 44 for removing the residual wall portion between adjacent vanes 22 are alternately provided in number equal to half the number of vanes 22, while, with respect to the die 43, a portion of the die 43 into which the punch 42 is to be inserted is bored into a through hole 45, and the remaining portion of the die 43 is left as it is and formed with a stepped projection 46 to be fitted into the annular stepped groove 38 formed at the underside of the bottom of the residual wall portion. Using such punch and die the extrusion-molding (shear-molding) is performed as indicated by an arrow b under a condition of "70 ton-press". The half of the residual wall portion is removed through one pressing operation, that is, parts of the residual wall portion corresponding to said punch portions 44 are alternately removed, and thereafter the primary molding A is rotated about the axial center of the punch 42 through an angle of 60° in this case and is subject to the second pressing operation thus to remove the whole of the residual wall portion with the vanes 22 left. Thereafter, unnecessary small projections such as burrs of the molding A are chemically or mechanically removed to obtain a secondary molding as a semi-finished product.

Through the foregoing pressing operations, the above-mentioned secondary molding whose vane number is equal to half that required for a magnetron anode and whose anode cylinder height (the height in the axial direction of the anode cylinder) is equal to half the height required for that magnetron anode can be obtained.

Figure 12:
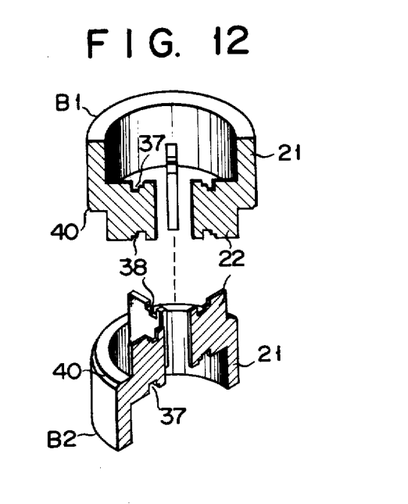
FIG. 12 is a sectional perspective view showing the manner in which two semi-finished products are joined together.
Figure 13:
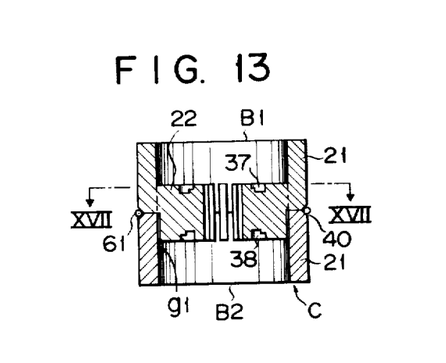
FIG. 13 is a longitudinal sectional view showing the joined condition.
Figure 14:
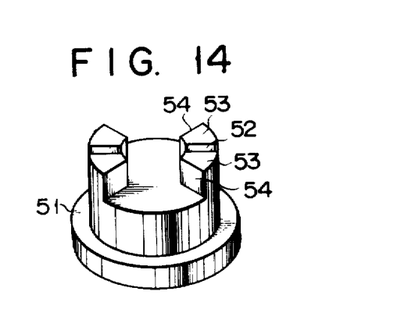
FIG. 14 is a perspective view showing a joining jig.
Figure 15:
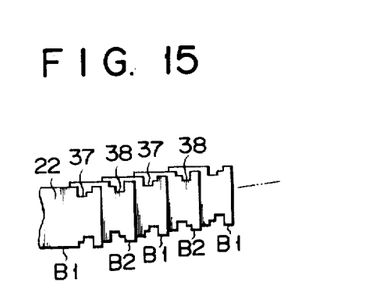
FIG. 15 is a perspective view diagrammatically showing the vane arrangement.

Next, two of the secondary moldings are prepared, and are disposed with their one-side ends directed to each other as shown in FIGS. 12 and 13, and are combined in a manner that at a middle position of the interspace between adjacent vanes of one molding B1 a given vane of the other molding B2 is disposed. When it is desired to maintain a vane-to-vane's interval constant, arrangement has only to be made, by using such a jig 51 as shown, for example, in FIG. 14, so that a given vane of said one molding B1 is inserted in advance into a groove 52 into which the vane is to be fitted; and the vane of said other molding B2 is disposed abutting on the side wall portion 54 of an intervening piece or spacer 53. When, in this way, combination of the second moldings is made, the outer side face of the vane 22 of said other molding B2 is cohered to, or approached, with a small clearance g1 of about 0.02 mm left, to the inner side face of the divided anode cylinder 21 of said one molding B1. Since both divided anode cylinders 21, 21 are allowed to contact each other at an intermediate position of the entire length of their vanes, a brazing material 61 is introduced into a brazing material-holding groove 40 formed at the outer periphery of the divided anode cylinder. When, this divided anode cylinder assembly is subject to brazing within a high temperature oven having a non-oxidizing atmosphere, the brazing material acts to bond together both of the divided anode cylinders and is allowed to flow also between the inner wall face of the divided anode cylinder of said one molding and the outer side face of the vane of said other molding to bond these together. Since, in this case, the brazing material flows into both upper and lower clearances g1 due to the capillary action, one brazing process is sufficient to permit all the vanes of one molding to be bonded with all the corresponding vanes of the other molding and simultaneously the divided anode cylinder of one molding to be bonded with that of the other molding. In this way, an anode cylinder whose length in the axial direction is about 32 mm and a vane structure whose vanes are radially arranged in prescribed number are obtained. Thus, the strap-ring attaching-stepped grooves formed in the side faces of the vanes alternately have the same configuration, as shown in FIG. 15, in respect of both the upper side faces and the lower side faces. In this way, a tertiary molding C is obtained.

Figure 16:
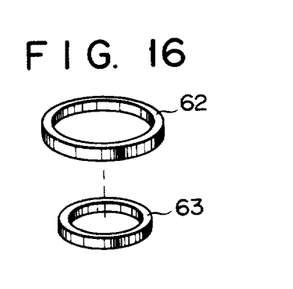
FIG. 16 is a perspective view of strap-rings.
Figure 17:
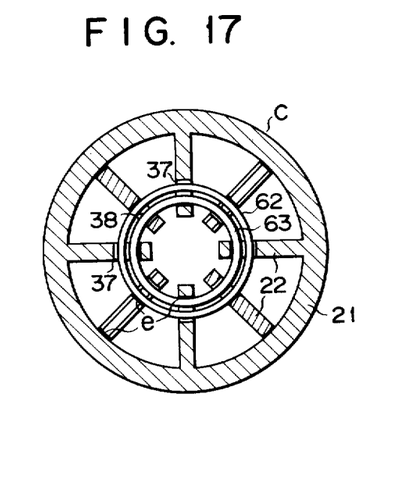
FIG. 17 is a cross sectional view taken along the line XVII—XVII of FIG. 13 and seen in an arrow-indicated direction, showing the condition wherein the strap-ring is welded.

Simultaneously, with the above-mentioned soldering or thereafter, a pair of strap-rings 62, 63 having different diameters as shown in FIG. 16 are fitted to the stepped grooves 37, 38 of the side face sections of the vane, respectively, and bonding between said strap-rings and said vane is effected on every other vane by brazing as shown in FIG. 17. Since, in this case, the above-mentioned stepped grooves 37, 38 alternately have the same configuration, a merely circular strap-ring can be used as rings 62 and 63, and this offers a great convenience in performing massproduction. Note that e in FIG. 17 denotes brazed portions. In the above-mentioned manner, a magnetron anode having a prescribed configuration is obtained.

Since, as above described, according to the method of the invention, vanes are integrally molded inside the divided anode cylinder and two divided anode cylinders are bonded together at a position of the vane, the extrusion-molding can be easily adopted when manufacturing and assembling the magnetron anode, and further an anode having a prescribed configuration can be easily obtained simply by coupling together an upper divided anode cylinder and a lower divided anode cylinder having the same configuration. Further, by integrally forming a divided anode cylinder and vanes of the number smaller than specified, the metal mold of a pressing machine, i.e., the punch and die can have a sufficiently high mechanical strength. Where every other vane is molded, the punch width between vane feet (S2 . . . , shown in FIG. 5) is 3.8 mm, about three times as large as the punch width of the prior art (1.2 mm).

Figure 18:
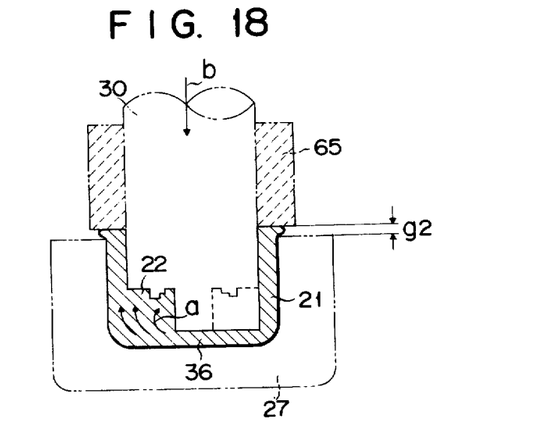
FIG. 18 is a schematic longitudinal sectional view of a press-mold, for explaining another anode manufacturing method of the invention.

The following partial modifications are possible without departing from the object and scope of the invention. (1) In the case of obtaining the primary molding A by extrusion-molding, a restraining ring 65 is previously faced on the die 27 so that the clearance g2 may become about 1 to 2 mm as shown in FIG. 18, thereby to carry out the press-molding. Mold material as constituting the divided anode cylinder portion 21 is restrained by the ring 65 from exteriorly flowing to an extent greater than required, and more reliably flows also into an internal tip end portion of the vane 22 as indicated by an arrow a. An amount of mold material exceeding said required amount flows out into the clearance g2.

Figure 19:
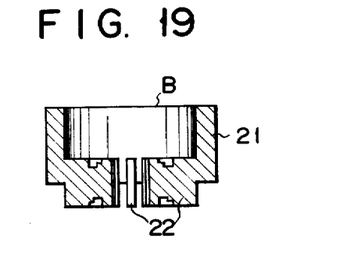
FIGS. 19 to 26 show another embodiment of the invention.

2. Through extrusion-molding the mold material, it is also possible to integrally mold such secondary molding B with no residual wall portion as shown in FIG. 19 by carrying out one pressing process.

Figure 20A:
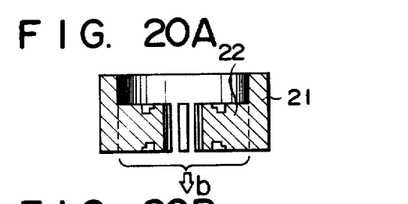
Figure 20B:
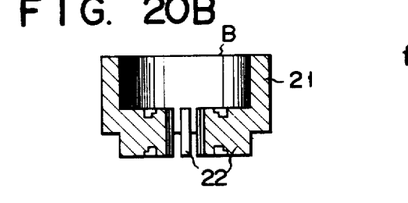

3. An integral molding whose vanes are provided in number equal to half the number of vanes required for a magnetron anode as shown in FIG. 20(A) is prepared, and only an extent corresponding to the vane 22 is downwardly moved as indicated by an arrow b through the restraining shearmolding, thereby to obtain the secondary molding B as shown in FIG. 20(B).

4. Where the primary molding with the residual wall portion is prepared as shown in FIG. 4, lower stepped grooves for attachment of a strap-ring may be formed not by extrusion-molding but by a lathe. Since, in this case, the grooves are annularly formed at the underside of the residual wall portion, the formation of these grooves can be made through working by a lathe in the cutting process shown in FIG. 8. Furthermore, provision of projections for molding said grooves at the die face is not suitable to mass-production since the projections do not have very high mechanical strength against the flow of the mold material when it is molded. Therefore, the method of the invention is more effective. Note that it is also possible to form upper stepped grooves by cutting.

Figure 21:
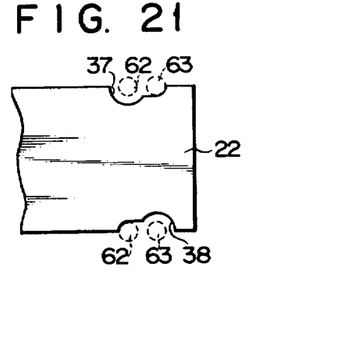

5. When the strap-ring attaching grooves are formed by extrusion-molding, they are preferably molded into large and small semicircular stepped grooves 37, 38 as shown in FIG. 21 in order to increase the mechanical strength of the groove-molding projections of the punch and die. In this case, strap-rings 62, 63 whose cross sections are circular have only to be used, and such strap-rings are prepared simply by forming a fine copper rod into a ring-like configuration, which offers a great convenience in performing said pressing operation and assembling or joining operation.

Figure 22:
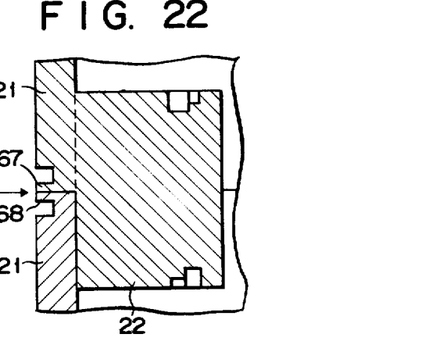

6. Where two divided anode cylinders are joined together, small thickness portions 67, 68 are circumferentially formed at the joining section as shown in FIG. 22, and may be hermetically welded together by arc welding or laser welding as indicated by an arrow f.

Figure 23A:
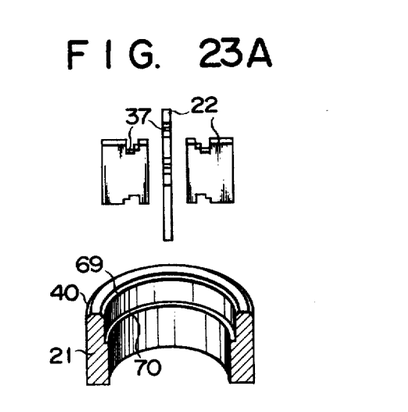
Figure 23B:
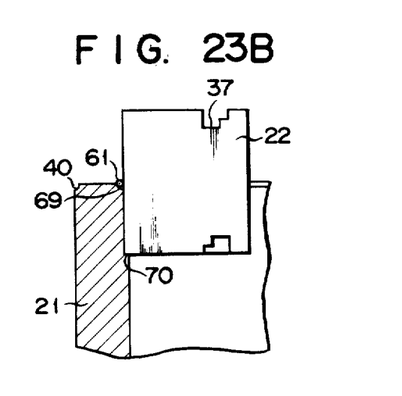

7. Preparation of the secondary molding is not limited to the method of integrally forming an anode cylinder and vanes by extrusion-molding. Though a little more time and labour are required, the secondary molding may be prepared by brazing, as shown in FIGS. 23(A) and 23(B). That is to say, the vanes 22 of the number equal to half the required number are inserted inside the divided anode cylinder 21 whose dimension is half the dimension of a specified anode cylinder of the magnetron anode, and both are first integrally bonded together by the brazing material 61. Each vane 22 is partially allowed to project exteriorly from one end of the divided anode cylinder 21, and all of the strap-ring attaching grooves 37 formed at one-side faces of the vanes are arranged having the same configuration. A reference numeral 70 denotes a stepped portion for positioning the vane. Two of the integrally molded semi-finished products, i.e., the secondary moldings B are combined with their one-side ends directed to each other, and thereafter are assembled in the manner previously mentioned referring to FIGS. 12 to 17. Note that a notch 69 formed inside the anode cylinder shown in FIGS. 23(A) and 23(B) is for the purpose of playing the role as a brazing material receptacle, for holding the brazing material and preventing the brazing material from unnecessarily flowing over the end face of the anode cylinder to cause a position displacement when combining two moldings with their oneside ends directed to each other.

8. It is not always necessary that the strap-ring attaching grooves provided at one side-faces of the vanes alternately have the same configuration. Even when the grooves at one side-faces of the vanes all have the same configuration it would well serve the purpose of a strap-ring having an irregular or zigzag configuration is used and every alternate vanes are electrically short-circuited. Even in such a case, the ease with which an anode cylinder is molded integrally with vanes is secured.

Figure 24:
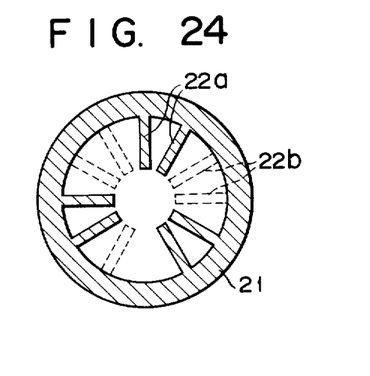

9. The number of vanes provided for a divided anode cylinder in a manner that the vanes are partially allowed to project exteriorly for the divided anode cylinder does not have to be limited to half the number of vanes required for a magnetron anode, but has only to be smaller than said required number. Further, the vanes to be previously fixed in one divided anode cylinder do not always have to be fixed alternately. For example, as shown in FIG. 24, when the vanes are assumed to be composed of plural consecutive units each consisting of two or more consecutive vanes, the vanes are formed in one divided anode cylinder on every other two-consecutive vane unit 22a, and the vanes 22b shown by dotted line are fixed in the other divided anode cylinder, thereby to prepare two semi-finished products or moldings and these two moldings may be combined or joined together.

Figure 25:
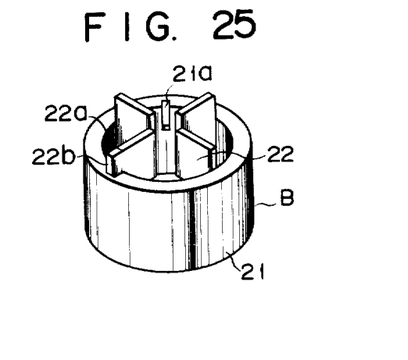

10. Where two semi-finished products whose vanes are projected in number equal to half the number of specified vanes of a magnetron anode are combined with their one-side ends directed to each other, the vane-to-vane's interval can be exactly provided in a manner shown in FIG. 25 or 26, without using the previously mentioned jig. In the case of FIG. 25, a semi-finished product b wherein a projected portion 22b is formed by allowing, for example, one vane 22a to project up to a halfway point of the wall thickness of the cylinder portion 21; and a concave portion 21a is formed at that portion of the cylinder portion 21 which corresponds to an intermediate portion between adjacent vanes is prepared, and two of such semi-finished products having the same configuration are combined with their one-side ends directed to each other. At this time, said projected vane portion 22b of one semi-finished product is fitted into said concave portion 21a of the cylinder portion of the other semi-finished product.

Figure 26:
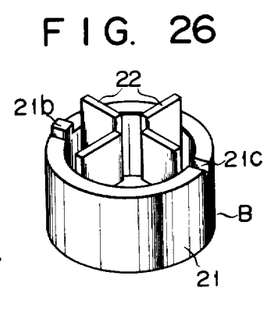

In the case of FIG. 26, a small projection 21b and a recess 21c are formed, respectively, on and in the end face of the cylinder portion 21 of the semi-finished product B at symmetrical positions. When two semi-finished moldings are combined together, said projection 21b and said recess 21c of one molding are fitted to said recess 21c and said projection 21b of the other molding, respectively, to enable both moldings to be positioned exactly.

The magnetron anode-manufacturing method described in the foregoing embodiments comprises, in order to mold a number of vanes 22, the steps of providing in advance vanemolding slits corresponding to the vanes 22 in the upper punch 30, and pressing from above the upper punch 30 against a copper material 25 put on a lower punch or die 27 having a substantially flat upper surface. Accordingly, the cooper material flows up into the vane-molding slits of the upper punch to form vanes each having a small thickness. This is, as previously mentioned, a "rearward extrusion-molding". But this rearward extrusion-molding has the following inconveniences.

1. Since the flowing direction of the mold material 25 is opposite to the advancing direction of the punch, the lateral flow of the mold material occurs unless it is hard, and as a result part of the vane portion often fails to rise up to a sufficient extent, so that difficulties are presented in uniformly molding small thickness-vanes. Accordingly, a mold material whose cure index for working, i.e., the value of n is small should be used.

2. Unless the thickness of the mold material is made larger than the height of vanes, i.e., the vane dimension in the axial direction of vanes, it becomes difficult to mold the vanes into specified configurations, which leads to an unnecessary consumption of the mold material.

3. A lateral pressure is applied to the punch by the mold material extruded into the vane-molding slits of the upper punch, to cause the punch to expand outwardly, so that the life of the punch is likely to become short. Thus, the dimension and configuration of the molded vane are gradually varied, and the molded vane becomes irresistible to use.

The following embodiment concerns the method of manufacturing a magnetron anode which eliminates the above-mentioned drawbacks and, even when the mold material has a high hardness, is capable of reliably achieving the vane molding and increasing the efficiency of material use, the punch life and the vane precision.

Hereinafter, this embodiment is explained by reference to FIGS. 27 to 34. Parts and sections the same as the above-mentioned are denoted by the same reference numerals.

Figure 31:
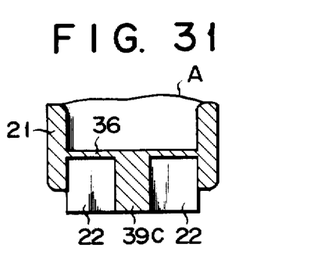
FIG. 31 is a longitudinal sectional view of a primary molding.
Figure 32:
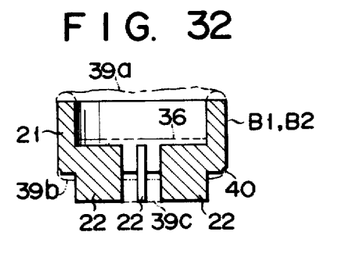
FIG. 32 is a longitudinal sectional view showing the condition of the third step.
Figure 33:
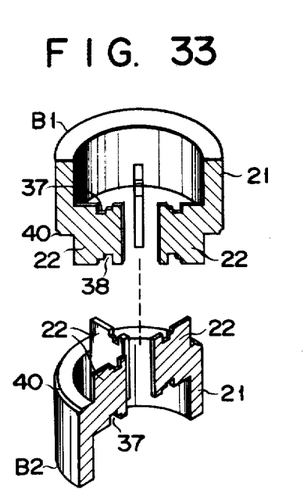
FIG. 33 is an exploded perspective view showing the joining step.
Figure 34:
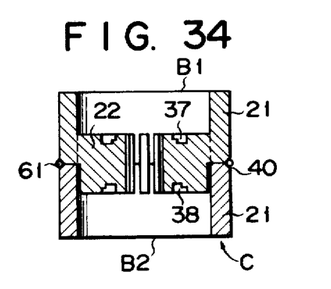
FIG. 34 is a longitudinal sectional view of a finished product.

The embodiment shown in FIGS. 27 to 34 is applied to the case where such two semi-finished moldings B1 and B2 as shown in FIG. 33 are prepared, and these two are combined and mode integral by brazing as shown in FIG. 34 to obtain a finished product or molding. In FIGS. 33 and 34, 21 denotes the anode cylinder portion, 22 the anode vanes, 37 and 38 the strapring attaching grooves, and 40 the notch for applying the brazing material 61.

Figure 27:
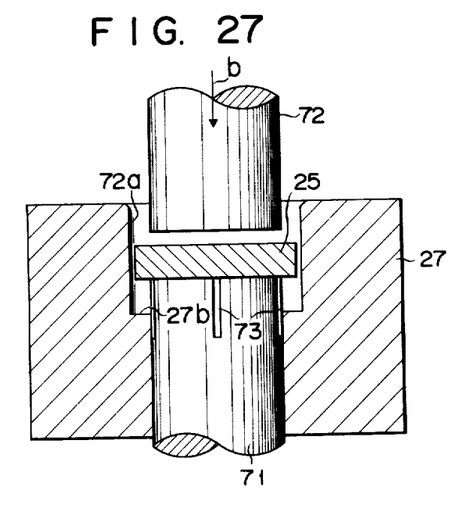
FIG. 27 is a longitudinal sectional view showing the condition of the initial step.
Figure 28:
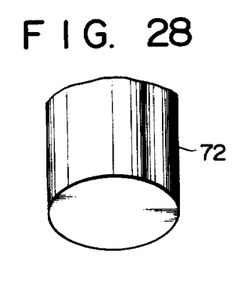
FIG. 28 is a perspective view of an upper punch.
Figure 29:
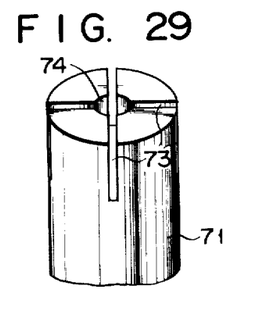
FIG. 29 is a perspective view of a lower punch.
Figure 30:
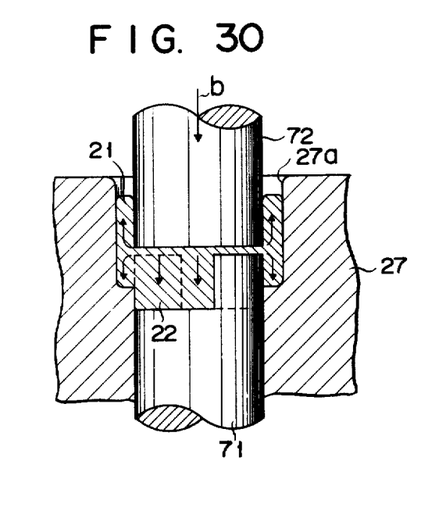
FIG. 30 is a longitudinal sectional view showing the condition of the second step.

First, the large thickness-disc shaped mold material 25 consisting of such oxygen free copper as shown in FIG. 28 is disposed between a first punch or lower punch 71 inserted into a hole at the bottom section of the outer side-die 27 and a second punch or upper punch 72, as shown in FIG. 27. Thereafter, the upper punch is allowed to drop with a great force to prepare the pirmary molding A shown in FIG. 31. The die 27 is formed with a hole 27a whose caliber is equal to the outer diameter of the anode cylinder portion 21. Further, the lower punch 71, as shown also in FIG. 29, is formed radially with vane-molding slits 73, 73, . . . , and is bored with a central hole 74 in a manner interconnected with said slits 73, and is fitted into the hole 27a of the die 27. In this case, a stepped bottom section 27b of the die 27 is so arranged as to be situated at a position a little lower than a middle point of the entire vertical length of the vane-molding slit 73 of the lower punch 71. The upper punch 72 is used in a form remaining to be columnar as shown also in FIG. 28. The outer diameter of the lower punch 71 and the upper punch 72 is made substantially equal to the inner diameter of the anode cylinder portion 21. While the mold material, the die and the punch are heated at a temperature of 200° to 300° C, the lower punch is fixed and the upper punch is pressed in a direction indicated by an arrow b, thereby to carry out the extrusion-molding. Thus is obtained the primary molding A shown in FIG. 31. In this extrusion-molding process, the mold material as indicated by arrows of FIG. 30, is partially allowed to flow into the vane-molding slits 73 and the central hole 74 of the lower punch 71 in the advancing direction of the punch to form a number of vanes, and further is partially allowed to flow into an interspace between the lower punch 71 and die 27 similarly in the advancing direction of the punch to form part of the anode cylinder portion. This is called "forward extrusion-molding". Further, the mold material is partially allowed to flow into an interspace between the upper punch 72 and die 27 in a direction opposite to that in which the upper punch 72 is pressed to form the remaining part of the anode cylinder portion. This is as previously mentioned, a rearward extrusion-molding. What is important is that a number of vanes each having an extremely small thickness are molded by the forward extrusion-molding while the anode cylinder portion is molded both by the forward extrusion-molding and by the rearward extrusion-molding. Since accordingly, the mold material constituting the vanes flows along the advancing direction of the upper punch, it is smoothly carried into the vane-molding slits of the lower punch. For this reason, the vanes 22 each having a specified configuration are molded more reliably. Further, the lower half and upper half of the anode cylinder portion 21 are subject to the "forward extrusion-molding" and "rearward extrusion-molding", respectively. Therefore, even in the case of molding an anode cylinder portion whose cylinder wall has a large thickness, the material flow becomes relatively easy.

Next, unnecessary portions 39a, 39b, a central columnnar residual wall portion 39c, and an extremely thin residual wall portion 36 at the top end of the vanes, of the primary molding A shown in FIG. 31 are cut, for example, by a lathe as shown in FIG. 32 to obtain the semifinished products or moldings B1 and B2 shown in FIGS. 32 to 34. In the foregoing statement, a detailed explanation of the process of molding the strapring attaching grooves to be formed at the upper and lower end portions of the vanes was omitted, but if projections for forming such strap-ring attaching grooves are formed on the lower punch 71, these grooves will be able to be simultaneously molded in the extrusion-molding process. Further, those grooves may be also molded by cutting.

The manufacturing method according to this embodiment comprising molding the vane portion of the magnetron anode by the forward extrusion-molding and molding the anode cylinder portion by the forward extrusion-molding and rearward extrusion-molding has the following excellent effects.

1. Since, in this manufacturing method, the vane portion whose vanes each have a small thickness is formed by the forward extrusion-molding, the mold material has an excellent plastic flowability and therefore can be more reliably molded into a vane having a specified configuration. Accordingly, molding can be executed irrespective of the hardness of a mold material.

2. Even application of a mold material whose thickness is smaller than the vane height, i.e., the vane dimension in the longitudinal direction of the vane permits the formation of vanes each hsving a specified configuration and dimension, and therefore the efficiency of material use is also high.

3. The vane-molding slit portion of the lower punch is fitted substantially halfway into the die, and therefore, even when a lateral pressure is applied to the punch due to the flow or overflow of the mold material this punch is mechanically reinforced by the die to cause little deformation of the punch. Accordingly, the punch life is prolonged as well. Simultaneously, a magnetron anode whose vane configuration and dimension are always uniform can be produced. This is a particularly excellent effect attainable by this embodiment.

Figure 35:
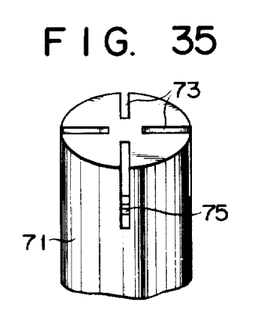
FIG. 35 is a perspective view of a lower punch used in a further embodiment of the invention.

In an embodiment shown in FIG. 35, the extrusion-molding is performed in the same manner as in the immediately preceding embodiment, using a lower punch 71 whose central portion is left as it is and is readially formed at its surroundings with the vane-molding slits 73. 75 denotes projections for forming the strap-ring attaching grooves. Since the mold material is thereby allowed to flow into the vane-molding slits 73 of the lower punch, the effeciency of material use is more increased.

The preceding embodiments refer to the case where a semi-finished product whose vanes are provided in number equal to half the required or specified number is prepared; and one such product is combined with another with their one-side ends directed to each other and both are bonded together to prepare a magnetron anode. But this invention is not limited to said case and can of course be applied also to the integral molding of an anode member whose vanes are just equal to the required or specified number. In this case, slits for molding all of said specified number of vanes have only to be formed in the lower punch.

Figure 36:
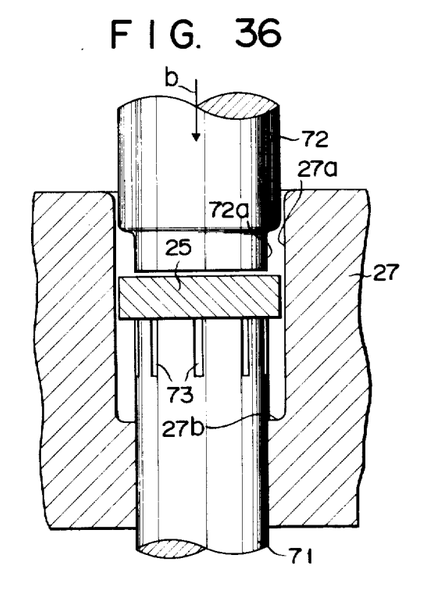
FIGS. 36 to 38 are longitudinal sectional views showing a further embodiment of the invention.
Figure 37:
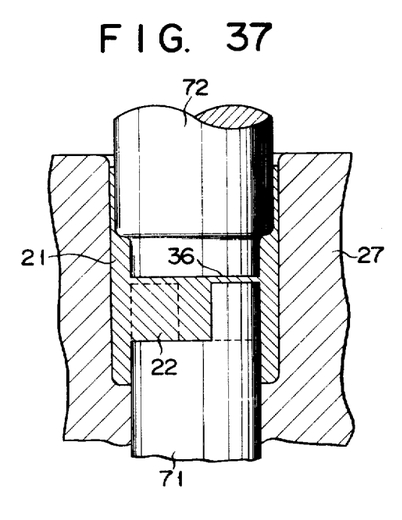
Figure 38:
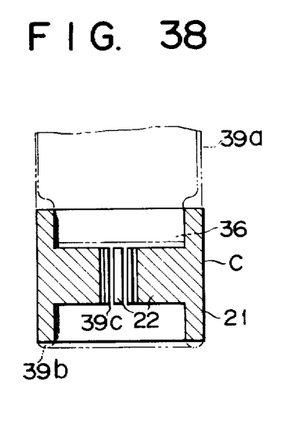

An embodiment shown in FIGS. 36 to 38 refers to the case where a specified configuration of anode cylinder portion and a specified number of vanes are formed by one extrusion-molding process. As shown in FIG. 36, slits 73, 73, . . . for forming all of a specified number of vanes are previously provided in the lower punch 71, and further a small diameter-portion 72a for molding a substantially half of the anode cylinder portion is provided at the tip end portion of the upper punch 72. Further, the hold 27a of the die 27 is deeply bored so that the anode cylinder portion can be molded downwardly projectively from the lower ends of the vane-molding slits 73 of the lower punch 71. With the use of such jig, the mold material 25 is placed between both the upper and lower punches, and the upper punch is pressed in a direction indicated by an arrow b thereby to carry out the extrusion-molding. In this manner, as indicated by an arrow of FIG. 36, the vane portion 22 is extrusion-molded in the same direction as the advancing direction of the upper punch, that is, is subject to the forward extrusion-molding while the anode cylinder portion 21 is subject to the forward extrusion-molding in respect of its lower half shown and subject to the rearward extrusion-molding in respect of its upper half shown. A dotted line-indicated residual wall portion of the primary molding thus obtained is removed by cutting as shown in FIG. 18 to obtain a finished product C.

As above described, in the manufacturing method of this embodiment, at least the vane portion is formed by the forward extrusion-molding. Therefore, even where the vane thickness is small, the material flow smoothly occurs to permit the reliable formation of vanes each having a specified configuration.

What we claim is:

1. A magnetron anode comprising: first and second divided anode cylinders concentrically joined together with their contacting end faces perpendicular to the cylinder axis, a plurality of substantially rectangular vanes molded to the inner periphery of each divided anode cylinder in number equal to half the number of all the vanes of the magnetron anode, arranged at prescribed intervals in the circumferential direction of the divided anode cylinder, and extending in the radial direction of the divided anode cylinder from the inner periphery of the same and in the axial direction of the divided anode partly from an end thereof, and means for integrally joining together said first and second divided anode cylinders in a state wherein the vanes of one divided anode cylinder are interdigitated with those of the other divided anode cylinder and bonded to the inner periphery of the other divided anode cylinder so as to have their upper and lower edges placed in a plane perpendicular to the cylinder axis.

2. A magnetron anode according to claim 1, wherein said first and second divided anode cylinders each have a length obtained by dividing the anode cylinder into two equal parts in a direction intersecting the cylinder axis at right angles thereto; the vanes of each of said divided anode cylinders are formed at intervals each equal to twice the vane interval of a finished anode cylinder; and said first and second divided anode cylinders and said vanes are integrally joined together into said finished anode cylinder by brazing in a state wherein each vane integrally molded in said first divided anode cylinder and each vane integrally molded in said second divided anode cylinder are alternately equidistantly arranged.

3. A magnetron anode according to claim 1, wherein each of said vanes is formed with a strap-ring attaching groove; a first strap-ring is commonly fitted in the grooves of the vanes provided inside said first divided anode cylinder; and a second strap-ring is commonly fitted in the grooves of the vanes provided inside said second divided anode cylinder.

4. A method for manufacturing a magnetron anode comprising the steps of: forming first and second divided anode cylinders and a plurality of vanes integral with the inner periphery of each divided anode cylinder at prescribed intervals in the circumferential direction of the divided anode cylinder in number equal to half the number of all the vanes of the magnetron anode so that the vanes extend from the inner periphery of the divided anode cylinder in the radial direction of the same, said forming step including the steps of fitting a first punch having a plurality of vane-molding slits and an outer diameter equal to the inner diameter of the divided anode cylinder into a die with a through hole the diameter of which is equal to the outer diameter of the divided anode cylinders, disposing a second punch with a flat tip end in such a manner that the tip end is faced to said first punch, extruding a mold material with said second punch in between said first and second punches to extrusion-mold said vanes in the direction of advance of said second punch, and extruding one half of each divided anode cylinder between said die and said first punch in a forward extrusion molding method, and the other half between said die and said second punch in a rearward extrusion molding method; and integrally joining together said first and second divided anode cylinders so that the vanes of the first divided anode cylinder are interdigitated with those of said second divided anode cylinder.

5. A method according to claim 4, wherein said process further comprises the steps of finishing each of said divided anode cylinders by removing a residual wall portion.

* * * * *